United States Patent
Karkkainen et al.

(10) Patent No.: US 9,201,625 B2
(45) Date of Patent: Dec. 1, 2015

(54) METHOD AND APPARATUS FOR AUGMENTING AN INDEX GENERATED BY A NEAR EYE DISPLAY

(75) Inventors: Leo Karkkainen, Helsinki (FI); Kongqiao Wang, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 6 days.

(21) Appl. No.: 13/530,650

(22) Filed: Jun. 22, 2012

(65) Prior Publication Data

US 2013/0342569 A1 Dec. 26, 2013

(51) Int. Cl.
- G09G 5/00 (2006.01)
- G06F 3/14 (2006.01)
- G02B 27/01 (2006.01)
- G06F 3/01 (2006.01)

(52) U.S. Cl.
CPC ............ *G06F 3/1423* (2013.01); *G02B 27/017* (2013.01); *G02B 2027/014* (2013.01); *G02B 2027/0127* (2013.01); *G02B 2027/0138* (2013.01); *G02B 2027/0178* (2013.01); *G06F 3/011* (2013.01); *G09G 2300/02* (2013.01); *G09G 2340/0407* (2013.01); *G09G 2354/00* (2013.01)

(58) Field of Classification Search
CPC ....... G06F 3/001; G06F 3/012; G02B 27/017; G06T 19/00; G06T 19/006
See application file for complete search history.

(56) References Cited

U.S. PATENT DOCUMENTS

| | | | |
|---|---|---|---|
| 8,055,296 B1 | 11/2011 | Persson et al. | |
| 8,072,393 B2 | 12/2011 | Riechel | |
| 2006/0017657 A1 | 1/2006 | Yamasaki | |
| 2006/0284791 A1 | 12/2006 | Chen et al. | |
| 2007/0243863 A1 | 10/2007 | Hong et al. | |
| 2010/0328344 A1* | 12/2010 | Mattila et al. | 345/633 |
| 2011/0248987 A1 | 10/2011 | Mitchell | |
| 2012/0038663 A1 | 2/2012 | Gustafsson et al. | |
| 2013/0033485 A1* | 2/2013 | Kollin et al. | 345/419 |
| 2013/0093661 A1 | 4/2013 | Ali | |

FOREIGN PATENT DOCUMENTS

| | | |
|---|---|---|
| JP | 2011-186856 A | 9/2011 |
| WO | WO 2008/054185 A1 | 5/2008 |

(Continued)

OTHER PUBLICATIONS

Martin Spindler, Sophie Stellmach, Raimund Dachselt; "PaperLens: Advanced Magic Lens Interaction Above the Tabletop"; Nov. 23-25, 2009; ITS '09; 1-8.*

(Continued)

*Primary Examiner* — Kee M Tung
*Assistant Examiner* — Nicholas R Wilson
(74) *Attorney, Agent, or Firm* — Alston & Bird LLP

(57) ABSTRACT

A method, apparatus and computer program product are provided in order to augment an index image generated by a near eye display in order to more clearly present at least a portion of the index image. In the context of a method, a position of the mobile terminal relative to an index image generated by a near eye display is determined. The method also determines an image to be presented by the mobile terminal based upon the index image and the position of the mobile terminal relative to the index image. The method also causes the image to be presented by the mobile terminal. A corresponding apparatus and a computer program product are also provided.

20 Claims, 7 Drawing Sheets

(56) References Cited

FOREIGN PATENT DOCUMENTS

| WO | WO 2011/084895 A1 | 7/2011 | |
|---|---|---|---|
| WO | WO2011127379 | * | 10/2011 |
| WO | WO 2011/150445 A1 | 12/2011 | |

OTHER PUBLICATIONS

Jarvenpaa, T. et al., *Compact Near-To-Eye Display With Inegrated Gaze Tracker*, Proc of SPIE, vol. 7001 (2008), pp. 1-8.

Polonen, M. et al., *Near-to-Eye Display—An Accessory For Handheld Multimedia Devices: Subjective Studies*, Journal of Display Technology, vol. 5, No. 9, (Sep. 2009), pp. 358-367.

Galaxy Skin: Samsung to release bendy-screened smartphones 'in Spring 2012 ' | Mail Onl . . . [online] [retrieved Aug. 14, 2012]. Retrieved from the Internet: <URL: http://www.dailymail.co.uk/sciencetech/article-2041969/Galazy-Skin-Samsung-release-bendy-screened-smartphones-Spring-2012.html?ITO-1490>. 10 pages.

ARDOORMoscow; "*Augmented Reality on iPad seen via Vuzix glasses*;" dated Feb. 17, 2011; retrieved on May 30, 2014 from <http://www.youtube.com/watch?v=7i1NYVaYv8g>.

ITS2009Conference; "[*ITS 2009 Demo*] *PaperLens: Advanced Magic Lens Interaction Above the Tabletop*;" dated Nov. 17, 2009; retrieved on May 30, 2014 from <http://www.youtube.com/watch?v=Ac1lng07Tec>.

International Search Report and Written Opinion for Application No. PCT/IB2013/055187; dated Apr. 29, 2014.

* cited by examiner

METHOD AND APPARATUS FOR AUGMENTING AN INDEX GENERATED BY A NEAR EYE DISPLAY

TECHNOLOGICAL FIELD

An example embodiment of the present invention relates generally to near eye displays and, more particularly, to the augmentation of an index image generated by a near eye display.

BACKGROUND

Near eye displays generate an index image that may be viewed by a user, such as by the person wearing or otherwise interacting with the near eye display. For example, one type of near eye display is a head worn display, such as a pair of eyeglasses, that permits the user to view a scene through the lenses of the eyeglasses. However, a near eye display, such as the eyeglasses, is also configured to generate an image that is presented upon the lenses so as to replace, enhance or supplement the user's view of the scene through the lenses of the eyeglasses.

Although the image is presented upon an image surface of the near eye display, such as upon the lenses of the eyeglasses, that is relatively close to the user, such as by being spaced by only one or a few centimeters from the user's eyes, the index image will appear to a user to be some distance away from the user, such as two to three meters away from the user. Although the index image generated by a near eye display can provide useful information, the index image may not be as clear, such as by not being as sharp, as would be desired by the user in some instances. In this regard, in instances in which the user focuses on an object at a much greater distance than the index image that appears to be presented about two to three meters from the user or an object much closer to the user than the index image that appears to be located about two to three meters from the user, the index image may appear to be less clear than may be desired.

BRIEF SUMMARY

A method, apparatus and computer program product are therefore provided according to an example embodiment of the present invention in order to augment an index image generated by a near eye display, such as by more clearly presenting at least a portion of the index image or by presenting a more detailed image of a portion of the index image. In this regard, the method, apparatus and computer program product of an example embodiment may utilize a mobile terminal to present a different image than the corresponding portion of the index image, such as by presenting an image that is more clear, more detailed or otherwise augmented relative to the corresponding portion of the index image. By positioning the mobile terminal in alignment with a portion of the index image that is of particular interest, the user may view the portion of the index image with more clarity, in more detail or in an augmented fashion while remaining within the context of the entire index image.

In one embodiment, a method is provided that includes determining, with a processor, a position of the mobile terminal relative to an index image generated by a near eye display. For example, the position of the mobile terminal relative to the index image may be based upon an image of one of the mobile terminal or the near eye display that is captured by a camera carried by the other one of the mobile terminal or the near eye display. The method of this embodiment also determines an image to be presented by the mobile terminal based upon the index image and the position of the mobile terminal relative to the index image. The method of this embodiment also causes the image to be presented by the mobile terminal.

In one embodiment, the image to be presented by the mobile terminal is determined by determining the portion of the index image that is aligned with the mobile terminal. In this embodiment, the portion of the index image that is aligned with the mobile terminal may be presented by the mobile terminal. The portion of the index image that is aligned with the mobile terminal may also be caused to be blanked from the near eye display.

The method of one embodiment may cause the image that is presented by the mobile terminal to be different than a portion of the index image that is aligned with the mobile terminal. For example, the image that is presented by the mobile terminal may be different than the aligned portion of the index image by being more clear than, more detailed than or augmented relative to the portion of the index image that is aligned with the mobile terminal.

In one embodiment, the method also includes receiving an indication that the mobile terminal is moved toward or away from a user of the near eye display. The method of this embodiment also causes the image that is presented by the mobile terminal to be zoomed, such as by being zoomed in or out, in response to the indication that the mobile terminal is moved toward or away from the user of the near eye display. In one embodiment, the method also determines an orientation of the mobile terminal with the determination of the image to be presented by the mobile terminal also being based upon the orientation of the mobile terminal.

In another embodiment, an apparatus is provided that includes at least one processor and at least one memory including computer program instructions with the at least one memory and the computer program instructions configured to, with the at least one processor, cause the apparatus at least to determine a position of a mobile terminal relative to an index image generated by a near eye display. For example, the at least one memory and the computer program instructions may be configured to, with the at least one processor, cause the apparatus to determine the position of the mobile terminal relative to the index image by determining the position of the mobile terminal relative to the index image based upon an image of one of the mobile terminal or the near eye display captured by a camera carried by the other one of the mobile terminal or the near eye display. The at least one memory and the computer program instructions of this embodiment are also configured to, with the at least one processor, cause the apparatus to determine an image to be presented by the mobile terminal based upon the index image and the position of the mobile terminal relative to the index image. The at least one memory and the computer program instructions are also configured to, with the at least one processor, cause the apparatus of this embodiment to cause the image to be presented by the mobile terminal.

The at least one memory and the computer program instructions are configured to, with the at least one processor, cause the apparatus of one embodiment to determine the image to be presented by the mobile terminal by determining a portion of the index image that is aligned with the mobile terminal. In this embodiment, the at least one memory and the computer program instructions may be configured to, with the at least one processor, cause the apparatus to cause the image to be presented by the mobile terminal by causing the portion of the index image that is aligned with the mobile terminal to be presented by the mobile terminal. In this embodiment, the at least one memory and the computer program instructions may be further configured to, with the at least one processor, cause the apparatus to cause the portion of the index image that is aligned with the mobile terminal to be blanked from the near eye display.

The at least one memory and the computer program instructions are configured to, with the at least one processor, cause the apparatus of one embodiment to cause the image that is presented by the mobile terminal to be different than a portion of the index image that is aligned with the mobile terminal. For example, the image that is presented by the mobile terminal may be different than the aligned portion of the index image by being more clear than, more detailed than or augmented relative to the portion of the index image that is aligned with the mobile terminal.

The at least one memory and the computer program instructions of one embodiment may be further configured to, with the at least one processor, cause the apparatus to receive an indication that the mobile terminal has moved toward or away from a user of the near eye display and to cause the image that is presented by the mobile terminal to be zoomed in response to the indication that the mobile terminal has moved toward or away from a user of the near eye display. In one embodiment, the at least one memory and the computer program instructions are further configured to, with the at least one processor, cause the apparatus to determine an orientation of the mobile terminal and to then determine the image to be presented by the mobile terminal based also upon the orientation of the mobile terminal.

In a further embodiment, a computer program product is provided that includes at least one non-transitory computer-readable storage medium bearing computer program instructions embodied therein for use with a computer with the computer program instructions including program instructions configured to determine a position of the mobile terminal relative to an index image generated by a near eye display. By way of example, the program instructions configured to determine the position of the mobile terminal relative to the index image may include program instructions configured to determine the position of the mobile terminal relative to the index image based upon an image of one of the mobile terminal or the near eye display captured by a camera carried by the other one of the mobile terminal or the near eye display. The computer program instructions of this embodiment also include program instructions configured to determine an image to be presented by the mobile terminal based upon the index image and the position of the mobile terminal relative to the index image. The computer program instructions of this embodiment also include program instructions configured to cause the image to be presented by the mobile terminal.

The program instructions of one embodiment that are configured to determine the image to be presented by the mobile terminal may include program instructions configured to determine a portion of the index image that is aligned with the mobile terminal. In this embodiment, the program instructions that are configured to cause the image to be presented by the mobile terminal may include program instructions configured to cause the portion of the index image that is aligned with the mobile terminal to be presented by the mobile terminal. The computer program instructions of this embodiment may also include program instructions configured to cause the portion of the index image that is aligned with the mobile terminal to be blanked from the near eye display.

The computer program instructions of one embodiment cause the image that is presented by the mobile terminal to be different than a portion of the index image that is aligned with the mobile terminal. For example, the image that is presented by the mobile terminal may be different than the aligned portion of the index image by being more clear than, more detailed than or augmented relative to the portion of the index image that is aligned with the mobile terminal.

In one embodiment, the computer program instructions further include program instructions configured to receive an indication that the mobile terminal is moved toward or away from the user of the near eye display. In this embodiment, the computer program instructions may also include program instructions configured to cause the image that is presented by mobile terminal to be zoomed in response to the indication that the mobile terminal is moved toward or away from a user of the near eye display.

In yet another embodiment, an apparatus is provided that includes means for determining a position of the mobile terminal relative to an index image generated by a near eye display. The apparatus of this embodiment also includes means for determining an image to be presented by the mobile terminal based upon the index image and the position of the mobile terminal relative to the index image. The apparatus of this embodiment also includes means for causing the image to be presented by the mobile terminal.

BRIEF DESCRIPTION OF THE DRAWINGS

Figure 1:
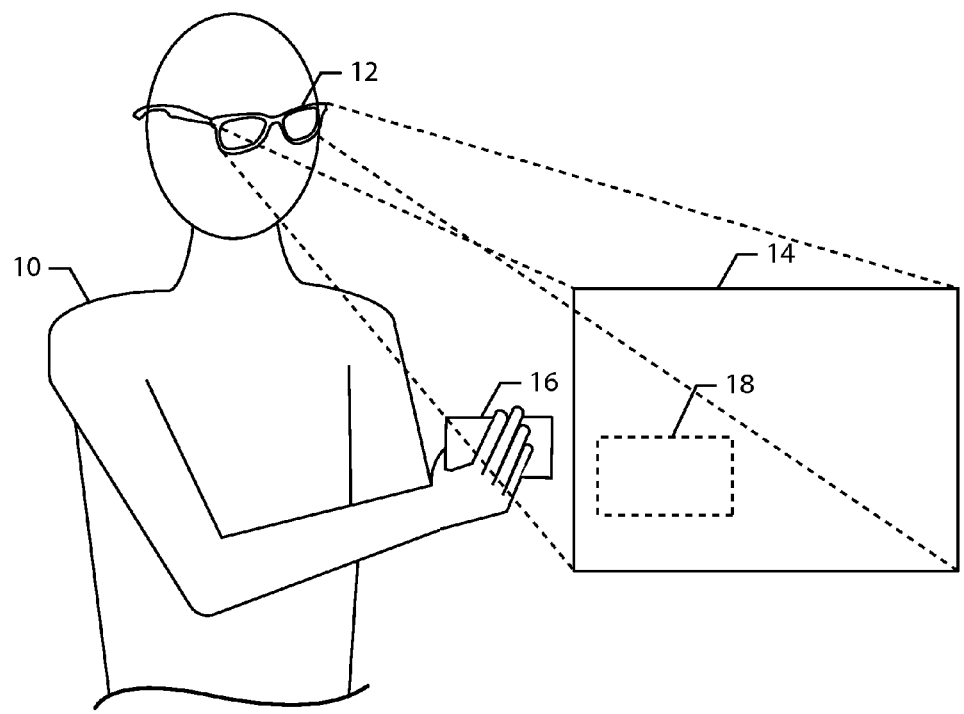
Figure 2:
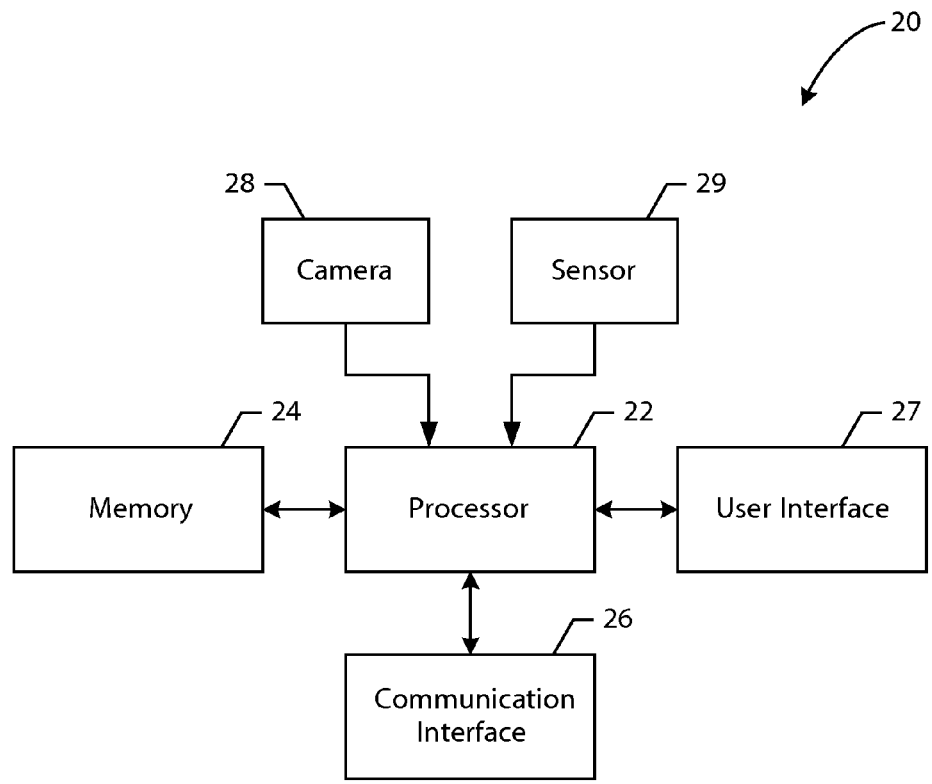
Figure 3:
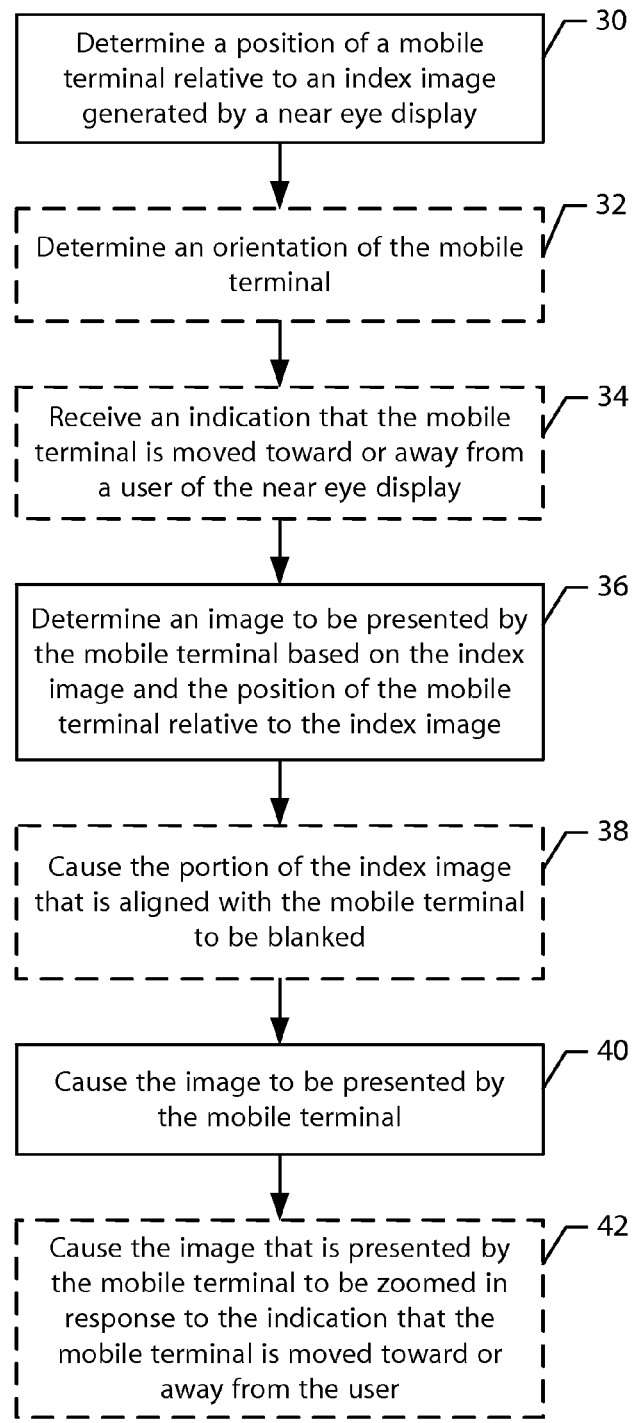
Figure 4:
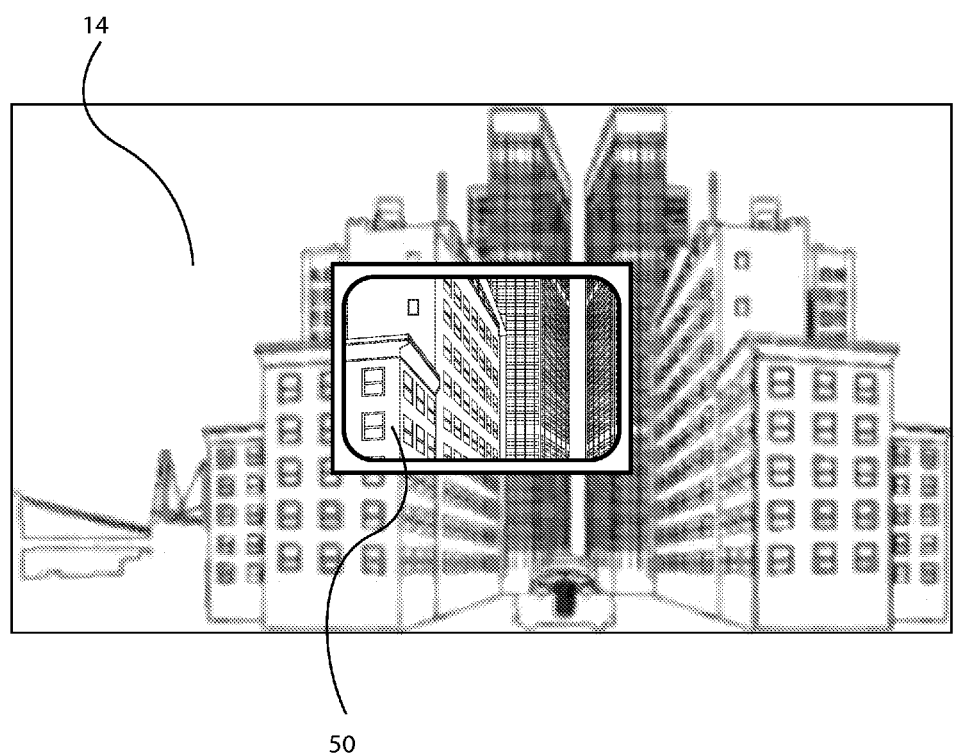
Figure 5:
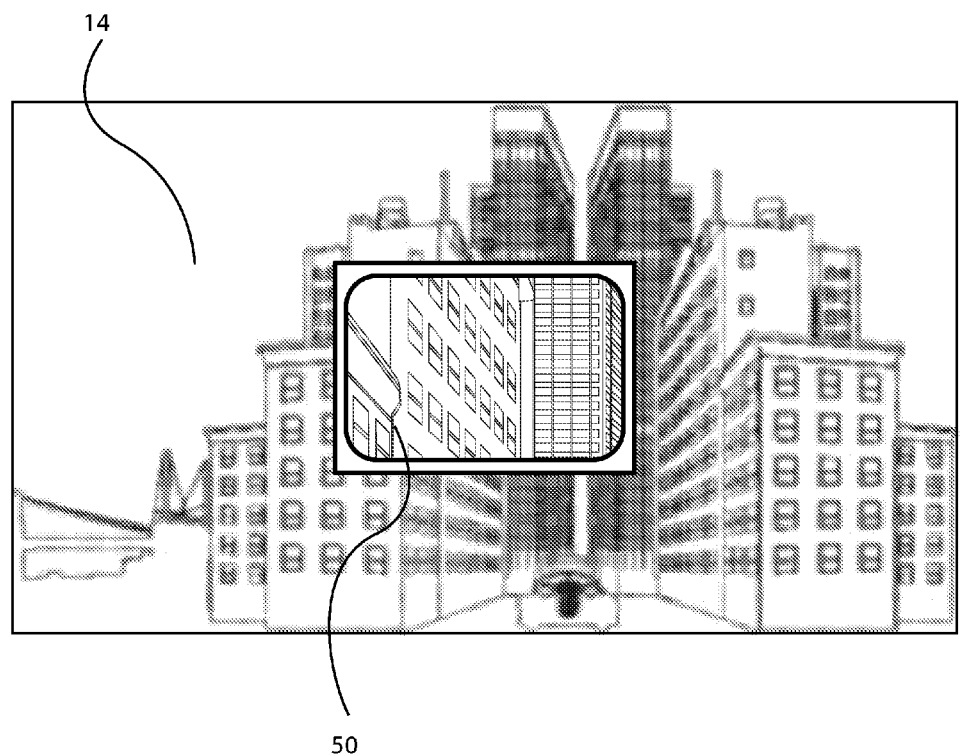
Figure 6:
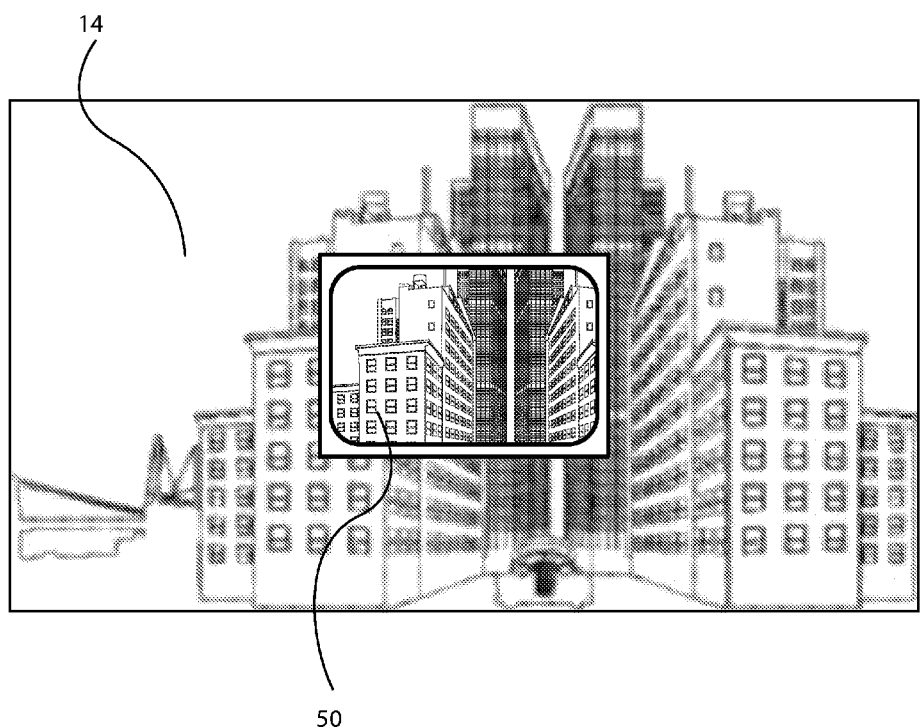
Figure 7:
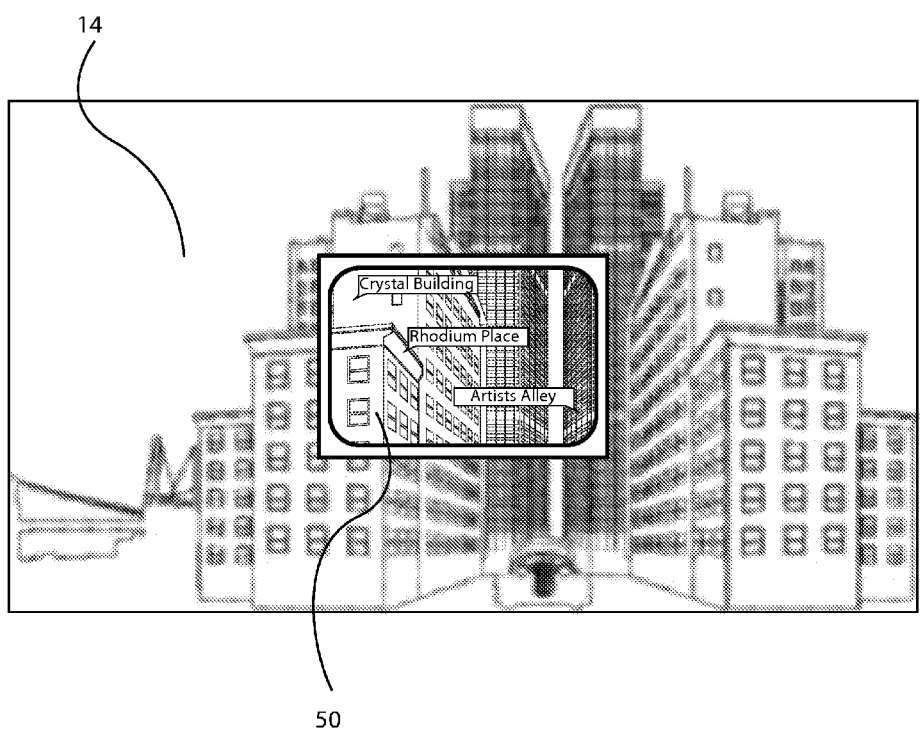

Having thus described certain embodiments of the invention in general terms, reference will now be made to the accompanying drawings, which are not necessarily drawn to scale, and wherein:

FIG. 1 is a schematic perspective view of a user viewing an index image generated by a near eye display that may be augmented by an image presented by a mobile terminal in accordance with an example embodiment of the present invention;

FIG. 2 is a block diagram of an apparatus that may be specifically configured in accordance with an example embodiment of the present invention;

FIG. 3 is a flow chart illustrating operations performed by an apparatus of FIG. 2 that is specifically configured in accordance with an example embodiment of the present invention;

FIG. 4 is a combination of an index image generated by a near eye display and an image presented by a mobile terminal in accordance with an example embodiment of the present invention;

FIG. 5 is a combination of an index image generated by a near eye display and an image presented by a mobile terminal that has been zoomed in in accordance with an example embodiment of the present invention;

FIG. 6 is a combination of an index image generated by a near eye display and an image presented by a mobile terminal that has been zoomed out in accordance with an example embodiment of the present invention; and FIG. 7 is a combination of an index image generated by a near eye display and an image presented by a mobile terminal that has been augmented with various identifiers in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements.

Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

A method, apparatus and computer program product are provided in accordance with an example embodiment of the present invention in order to augment an index image generated by a near eye display. In this regard, a method, apparatus and computer program product of an example embodiment may utilize an image presented by mobile terminal to replace or supplement a portion of the index image generated by the near eye display. As the image as presented by the mobile terminal may differ from other portions of the index image, such as by being more clear or in more detail than other portions of the index image, the image as presented by the mobile terminal may be utilize the augment the index image such as by more clearly presenting portions of the image that are of particular interest to the user. In some of the embodiments, the image that is presented by the mobile terminal may provide access to volumetric, layered, zoomable and/or temporal information space that is included within or otherwise represented by the index image generated by the near eye display.

As shown in FIG. 1, a user 10 may utilize a near eye display 12 so as to view an index image 14 that is generated by the near eye display. A user may utilize various types of near eye displays including head worn displays, such as the eyeglasses depicted in the embodiment of FIG. 1. A near eye display may generate and present an image upon an image surface, such as upon the lenses of the eyeglasses. Although the image is presented upon an image surface that is relatively close to the user, such as one to two centimeters from the user, an index image appears to the user to be positioned some distance from the user, such as about two to three meters from the user as shown in FIG. 1. In some embodiments, the index image fills the field of view of the user. In other embodiments, however, the user may see through the index image so as also view objects beyond the index image or, in some instances, the user may view objects that are positioned between the user and the location at which the index image appears to be presented.

As shown in FIG. 1, the user 10 may also utilize a mobile terminal 16. In this regard, the user may position the mobile terminal within the user's field of view so as to overlay at least a portion of the index image 14. In this regard, the user may position the mobile terminal so as to be between the user and the location at which the index image appears to be located, such as by being held with the normal reach of the user, e.g., 20 to 50 centimeters from the user. Once the relative position of the mobile terminal with respect to the index image is determined, the portion of the index image that is aligned with the mobile terminal may be presented by the mobile terminal, albeit more clearly or in more detail than other portions of the index image. Thus, a user may view a composite image including the index image generated by the near eye display 12 as augmented by the image that is presented by the mobile terminal. By positioning the mobile terminal relative to the index image such that the mobile terminal is aligned with a portion of the index image that is of particular interest to the user, the user may be able to view the selected portion of the index image more clearly or in more detail than other portions of the index image.

Various types of near eye displays 12 may be utilized to present the index image 14. For example, the near eye display may be a head worn display, such as a pair of eyeglasses, that permits the user to view a scene through the lenses of the eyeglasses. Likewise, various types of mobile terminal 16 may be employed to present an image that is based upon the index image and the relative position of the mobile terminal. For example, the mobile terminal may be a mobile telephone, a personal digital assistant (PDAs), a pager, a laptop computer, a tablet computer or any of numerous other hand held or portable communication devices, computation devices, content generation devices, content consumption devices or combinations thereof.

In addition to the near eye display 12 and the mobile terminal 16, the system of an embodiment of the present invention may include an apparatus 20 as generally described below in conjunction with FIG. 2 for performing one or more of the operations set forth by FIG. 3 and also described below. In this regard, the apparatus may be embodied by the near eye display and/or the mobile terminal. In this embodiment, the near eye display and the mobile terminal may be in communication with one another, either directly, such as via a wireless or wireline connection, or indirectly via one or more intermediate computing devices. In this regard, the near eye display and the mobile terminal may be parts of the same system in one embodiment. However, the apparatus may alternatively be embodied by another computing device that is in communication with the near eye display and the mobile terminal, such as via a wireless connection, a wireline connection or the like.

It should also be noted that while FIG. 2 illustrates one example of a configuration of an apparatus 20 for augmenting an index image 14 generated by a near eye display 12, numerous other configurations may also be used to implement other embodiments of the present invention. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

Referring now to FIG. 2, the apparatus 20 for augmenting the index image 14 generated by a near eye display 12 in accordance with one example embodiment may include or otherwise be in communication with one or more of a processor 22, a memory 24, a communication interface 26, a user interface 27, a camera 28 and a sensor 29. In some embodiments, the processor (and/or co-processors or any other processing circuitry assisting or otherwise associated with the processor) may be in communication with the memory device via a bus for passing information among components of the apparatus. The memory device may include, for example, a non-transitory memory, such as one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor 3. Additionally or alternatively, the memory device could be configured to store instructions for execution by the processor.

In some embodiments, the apparatus 20 may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

Meanwhile, the communication interface 26 may be any means such as a device or circuitry embodied in either hardware or a combination of hardware and software that is configured to receive and/or transmit data from/to a network and/or any other device or module in communication with the apparatus 20, such as by supporting communications with the near eye display 12 and the mobile terminal 16. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

The apparatus 20 may include a user interface 27 that may, in turn, be in communication with the processor 22 to provide output to the user and, in some embodiments, to receive an indication of a user input. For example, the user interface may include a display and, in some embodiments, may also include a keyboard, a mouse, a joystick, a touch screen, touch areas, soft keys, a microphone, a speaker, or other input/output mechanisms. In one embodiment, the display of the apparatus may be embodied by the near eye display. For example, in an instance in which the near eye display 12 is embodied as a pair of eyeglasses, one or both of the lenses of the eyeglasses may serve as the display upon which the image is presented. The processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory 24, and/or the like).

In some example embodiments, the apparatus 20 may include an image capturing element, such as a camera 28, video and/or audio module, in communication with the processor 22. The image capturing element may be any means for capturing an image, video and/or audio for storage, display or transmission. For example, in an example embodiment in which the image capturing element is a camera, the camera may include a digital camera capable of forming a digital image file from a captured image. As such, the camera may include all hardware (for example, a lens or other optical component(s), image sensor, image signal processor, and/or the like) and software necessary for creating a digital image file from a captured image. Alternatively, the camera may include only the hardware needed to view an image, while a memory device 24 of the apparatus stores instructions for execution by the processor in the form of software necessary to create a digital image file from a captured image. In an example embodiment, the camera may further include a processing element such as a co-processor which assists the processor in processing image data and an encoder and/or decoder for compressing and/or decompressing image data. The encoder and/or decoder may encode and/or decode according to, for example, a joint photographic experts group (JPEG) standard, a moving picture experts group (MPEG) standard, or other format.

As shown in FIG. 2, the apparatus 20 may also include a sensor 29, such as a gyroscope, that may be in communication with the processor 22 and may be configured detect changes in motion and/or orientation of the apparatus.

The method, apparatus 20 and computer program product may now be described in conjunction with the operations illustrated in FIG. 3. In this regard, the apparatus may include means, such as the processor 22, the camera 28 or the like, for determining a position of a mobile terminal 16 relative to the index image 14 generated by a near eye display 12. See block 30 of FIG. 3. The position of the mobile terminal relative to the index image may be determined in various manners. In one embodiment, a camera carried by either the mobile terminal or the near eye display captures an image that includes the other one of the mobile terminal and the near eye display. Based upon the image of the other one of the mobile terminal and the near eye display, the position and the orientation of the other one of the mobile terminal or the near eye display may be determined and the position of the mobile terminal relative to the index image generated by the near eye display may be correspondingly determined.

In an instance in which the near eye display 12 includes a camera 28 that captures an image that includes the mobile terminal 16, the mobile terminal may be recognized within the image based upon the shape of a mobile terminal. However, the mobile terminal of one embodiment may include an identifier or a marker to facilitate the identification of the mobile terminal. For example, a mobile terminal may include a marker or an identifier on each of the four corners of the mobile terminal such that the mobile terminal may be readily identified within the image captured by the near eye display based upon the markers carried by the mobile terminal. Based upon the image of the mobile terminal captured by the camera carried by the near eye display, the position and orientation of the mobile terminal relative to the near eye display may be determined and, as a result, the position of the mobile terminal relative to the index image generated by the near eye display may be determined.

In another embodiment in which the camera is carried by the mobile terminal so as to capture an image of the near eye display, the position and orientation of the near eye display may be determined by identifying the near eye display based upon the shape of the near eye display or based upon the shape of the user's head. However, the near eye display of one embodiment may carry a marker or other indicator that may be recognized from the image of the near eye display captured by the mobile terminal so as to facilitate the identification of the near eye display. For example, the near eye display may include a plurality of markers or other identifiers, such as by having a marker placed upon each of four corners of the near eye display, to facilitate identification of the near eye display within the image captured by the mobile terminal. Based upon the image of the near eye display captured by the camera carried by the mobile terminal, the position and orientation of the near eye display relative to the mobile terminal may be determined and, as a result, the position of the mobile terminal relative to the index image generated by the near eye display may be determined.

As described above and as illustrated by block 30 of FIG. 3, the position of the mobile terminal 16 is determined relative to the index image 14 generated by the near eye display 12. In one embodiment, the determination of the position of the mobile terminal is accomplished by determining the position of the display of the mobile terminal relative to the index image since the image that is to be presented by the mobile terminal as described below will be presented upon the display of the mobile terminal. Thus, reference herein to the determination of the position of the mobile terminal relative to the index image includes the determination of the position of the display of the mobile terminal relative to the index image. In this embodiment, a camera carried by the near eye display may capture an image including the display of the mobile terminal from which the four corners of the display and, in turn, the location of the display may be located. The distance to the display and the tilt of the display may be also be determined, such as based upon the image captured by the near eye display and/or based upon one or more accelerometers carried by the near eye display.

As shown in block 36 of FIG. 3, the apparatus 20 may also include means, such as the processor 22 or the like, for determining an image to be presented by the mobile terminal 16 based upon the index image 14 and the position of the mobile terminal relative to the index image. In one embodiment, the portion of the index image that is aligned with the mobile terminal (such as designated as 18 in FIG. 1) may be presented by the mobile terminal. Although the index image may continue to include the portion that is also presented by the mobile terminal, the apparatus of one embodiment may include means, such as the processor or the like, for causing the portion of the index image that is aligned with the mobile terminal to be blanked from the near eye display, as shown in block 38 of FIG. 3. By blanking the portion of the index image from the near eye display that is aligned with the mobile terminal, the potential for interference or other blurring of the image presented by the mobile terminal based upon or attributable to the image also being presented upon the aligned portion of the index image may be reduced.

The apparatus 20 of one embodiment also includes means, such as the processor 22, the communication interface 26, the user interface 27 or the like, for causing the image to be presented by the mobile terminal 16, such as upon the display of the mobile terminal. See block 40 of FIG. 3. In this regard, the portion of the index image 14 that is aligned with the mobile terminal may be presented by the mobile terminal itself. As such, a user viewing the index image may view a composite image with one portion of the index image being presented by the mobile terminal and overlaid upon the remainder of the index image that is generated by the near eye display 12. For example, FIG. 4 illustrates an index image that includes a portion that is aligned with the mobile terminal. As such, the image 50 that is presented by the mobile terminal is overlaid upon the index image and such that the resulting combination being viewed by the user as a composite image.

In one embodiment, the image 50 that is presented by the mobile terminal 16 is different than the portion of the index image 14 that is aligned with the mobile terminal. The image that is presented by the mobile terminal may be different in various manners. For example, the image that is presented by the mobile terminal may be presented more clearly by the mobile terminal than other portions of the index image 14 that are generated by the near eye display 12. See, for example, FIG. 4. Additionally or alternatively, the image that is presented by the mobile terminal may be presented in more detail than other portions of the index image that is generated by the near eye display, e.g., an image of a streetscape may be presented by the mobile terminal while the index image may present a map of the surrounding area. While the image that is presented by the mobile terminal may be more clear or in more detail than the index image generated by the near eye display, the image that is presented by the mobile terminal may be augmented in other manners in other embodiments. By way of example, the index image may be augmented by the presentation of additional information, such as identifiers or other indicia, associated with objects within the index image. See, for example, FIG. 7. As such, the user may position that mobile terminal so as to overlie a portion of the index image that the user desires to view in more detail. As such, the image as presented by the mobile terminal and overlaid upon the index image may more clearly or in more detail present the respective portion of the index image so as to facilitate closer review by the user.

By way of example of the difference between the image 50 that is presented by the mobile terminal 16 and the portion of the index image 14 that is aligned with the mobile terminal, the index image generated by the near eye display 12 may be viewed in the background as a relatively large display. However, the number of pixels of the near eye display may be less than the number of pixels of the display of the mobile terminal such that the image that is presented by the mobile terminal is more clear since the brightness of the image that is presented by the mobile terminal is greater than the brightness of the index image and/or since the image that is presented by the mobile terminal is crisper than the index image. Thus, even though the image presented by the mobile terminal and the index image provide the same content, the image presented by the mobile terminal in this example embodiment is different in that it is more clear than the index image.

In another example of the difference between the image 50 that is presented by the mobile terminal 16 and the portion of the index image 14 that is aligned with the mobile terminal, the display of the mobile terminal is not transparent and cannot be seen through in the same manner as the index image. Thus, background light does not affect the image quality of the image that is presented by the mobile terminal as much as the index image. For example, the mobile terminal may be held in front of the sun and may capture an image of the sun with the captured image being presented by the mobile terminal, complete with sunspots. The index may be an image of the stars in the sky such that the display of the detailed image of the sun by the mobile terminals augments the index image.

As a further example, the index image 14 may present a set of objects, such as a plurality of garments that are for sale. The mobile terminal 16 may be aligned with one of the objects and the aligned object may be selected, such as upon receipt of user input via the mobile terminal. An image 50 of the selected object may then be displayed by the mobile terminal. As the mobile terminal is rotated or turned, such as detected by a sensor, e.g., a gyroscope, carried by the mobile terminal, an image of the selected object from different directions, e.g., from different perspectives, may be displayed by the mobile terminal. For example, in an instance in which the object is a garment, the rotation of the mobile terminal permits the garment to be viewed from different directions. Thus, the image presented by the mobile terminal in this embodiment may differ from the index image by providing more detail.

By moving the mobile terminal 16 relative to the index image 14, the user 10 may effectively scroll through the index image, thereby allowing the mobile terminal to serve as a movable lens relative to the index image. As a result of the relative movement of the mobile terminal and the index image, different portions 18 of the index image may be overlaid by the mobile terminal such that the image 50 presented upon the mobile terminal may vary as the mobile terminal moves with respect to the underlying index image, thereby permitting the user to view different portions of the index image more clearly as a mobile terminal moves relative to the index image. While the user may scroll through the index image by simply moving the mobile terminal, the user may alternatively scroll through the index image by holding the mobile terminal fixed in position and moving the near eye display 12, such as by the user 10 moving their head. Still further, both the mobile terminal and the near eye display may be moved, such as in opposite directions, in order to provide even faster scrolling through the index image.

In one embodiment, the image 50 as presented by the mobile terminal 16 may be zoomed relative to other portions of the index image 14. In this embodiment, the apparatus 20 may include means, such as the processor 22, the sensor 28 or the like, for receiving an indication that the image should be zoomed. In one embodiment, the indication is provided by the mobile terminal being moved toward or away from the user 10 of the near eye display 12. See block 34 of FIG. 3. For example, the sensor, such as a gyroscope, may be configured to detect movement of the mobile terminal toward or away from the user. The apparatus of this embodiment may also include means, such as the processor, the communications interface 26, the user interface 27 or the like, for causing the image that is presented by the mobile terminal to be zoomed in response to the indication that the mobile terminal has moved toward or away from the user. See block 42 of FIG. 3. For example, moving the mobile terminal toward the user may cause the image that is presented by the mobile terminal to be zoomed in, thereby providing greater detail although within a smaller field of view. See, for example, FIG. 5. Alternatively, movement of the mobile terminal away from the user may cause the image that is presented by the mobile terminal to be zoomed out, thereby providing less detail although across a wider field of view. See FIG. 6. Other types of indications may be received that indicate that the image as presented by the mobile terminal is to be zoomed, such as other types of movement, e.g., rotation of the mobile terminal, tilt of the mobile terminal, etc. or voice input. As another example, the mobile terminal may be flexed, such as by bending the mobile terminal so as to arch toward the user or away from the user, thereby causing the image as presented by the mobile terminal to be zoomed in and zoomed out, respectively.

The image that is presented by the mobile terminal 16 need not necessarily remain in synchronization with the index image as the image presented by the mobile terminal is zoomed in or out. For example, if the mobile terminal is moved towards the user, the image presented by the mobile terminal may be zoomed in disproportionally so that it zooms in more and thus covers less of the index image than it overlays. This effect may be useful when the user wants to see, e.g., details, and does not require the image presented by the mobile terminal to be in complete synchronization with the index image. As another example, when the mobile terminal is moved towards the user, the image presented by the mobile terminal may be zoom out, while when the mobile terminal is moved away from the user, the image presented by the mobile terminal may zoom in.

In some embodiments, the index image 14 is representative of a volumetric, layered or temporal space having a third or additional dimensions in addition to the two dimensions represented by the index image. Thus, the zooming functionality that is provided, such as in response to movement of the mobile terminal 16 toward or away from the user 10, may cause the image 50 that is presented by the mobile terminal to be translated along the third or other dimension, such as by depicting a cross-sectional view within the volumetric space, depicting a different layer within the layered space or depicting an image from a different time within the temporal space.

In another embodiment, the orientation of the mobile terminal 16 may also be utilized as an input parameter in regards to the determination of the image that is to be presented by the mobile terminal 16. In this embodiment, the apparatus 20 may include means, such as the processor 22, the sensor 29 or the like, for determining an orientation of the mobile terminal relative to the index image 14. See block 32 of FIG. 3. For example, the sensor, such as a gyroscope, may be configured to determine the orientation of the mobile terminal. In this embodiment, the determination of the image to be presented by the mobile terminal may be based not only on the index image and the position of the mobile terminal relative to the index image, but also based upon the orientation of the mobile terminal.

By way of example, the index image 14 may be a map. By differently orienting the mobile terminal 16 relative to the index image, the image that is presented by the mobile terminal may be a streetscape with the orientation of the streetscape being defined by the orientation of the mobile terminal relative to the index image. For example, the index image may be a satellite image. By placing the mobile terminal relative to the satellite image, a more detailed image of the portion of the satellite image that is aligned with the mobile terminal, such as the streetscape of the aligned portion of the satellite image, may be presented by the mobile terminal. Continuing with this example, rotation or turning of the mobile terminal, such as sensed by a sensor, e.g., a gyroscope, may permit the more detailed image, such as the streetscape, to be viewed from different directions corresponding to the orientation of the mobile terminal with respect to the index image.

Although an index image 14 in the form of a photographic image or a map has been described above, a near eye display 12 may generate various types of index images that may be augmented by the image 50 presented by a mobile terminal 16. For example, the index image may include temporal information, such as videos. As such, the movement of the mobile terminal relative to this index image may permit a user to view, in more detail, various thumbnails or other representations of the videos, such as to facilitate a user's selection of a respective video.

Additionally or alternatively, the mobile terminal 16 may be utilized to paste an image or other content into the index image 14 generated by the near eye display 12. In this embodiment, the mobile terminal may be positioned relative to the index image and the user 10 may then provide input indicating that an image or other content stored or otherwise maintained by the mobile terminal is to be inserted in the index image. In this regard, the image or other content stored or maintained by the mobile terminal may then be provided to near eye display and, in turn, included within the index image that is generated by the near eye display at a location defined by the relative position of the mobile terminal with respect to the index image at the time at which the user input was received. Additionally or alternatively, the image or other content stored or maintained by the mobile terminal may be compared to various portions of the index image to determine the location within the index image that corresponds to the image or other content stored or maintained by the mobile terminal. In an instance in which the index image is a map, a satellite image or the like, the comparison of an image stored or maintained by the mobile terminal to the index image may determine the location at which the image was captured.

As described above, FIG. 3 illustrates a flowchart of an apparatus 20, method, and computer program product according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory 24 of an apparatus employing an embodiment of the present invention and executed by a processor 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly That which is claimed:

1. A method comprising:
determining, with a processor, a position of a mobile terminal relative to an index image generated by a near eye display of a user, wherein the mobile terminal comprises an electronic computation device comprising a display, wherein the near eye display is configured to be worn by the user, wherein the index image appears to be at a location further from the near eye display than the mobile terminal that is positioned between the near eye display and the location at which the index image appears, and wherein determining the position of the mobile terminal relative to the index image comprises determining the position of the mobile terminal relative to the index image based upon an image of one of the mobile terminal or the near eye display captured by a camera of the other of the mobile terminal or the near eye display;
determining an image to be presented by the display of the mobile terminal based upon the index image and the position of the mobile terminal relative to the index image, wherein determining the image to be presented by the display of the mobile terminal comprises determining a portion of the index image that is visually aligned with the mobile terminal from a perspective of the user; and
causing the image to be presented by the mobile terminal itself upon the display of the mobile terminal with the image being based on the portion of the index image that is visually aligned with the mobile terminal from the perspective of the user.

2. A method according to claim 1 wherein causing the image to be presented by the mobile terminal comprises causing the portion of the index image that is aligned with the mobile terminal to be presented by the mobile terminal.

3. A method according to claim 2 further comprising causing the portion of the index image that is aligned with the mobile terminal to be blanked from the near eye display.

4. A method according to claim 1 wherein causing the image to be presented by the mobile terminal comprises causing the image that is presented by the mobile terminal to be different than a portion of the index image that is aligned with the mobile terminal.

5. A method according to claim 4 wherein causing the image that is presented by the mobile terminal to be different comprises causing the image that is presented by the mobile terminal to be more clear than, to be more detailed than or to be augmented relative to the portion of the index image that is aligned with the mobile terminal.

6. A method according to claim 1 further comprising:
receiving an indication that the mobile terminal is moved toward or away from as user of the near eye display; and
causing the image that is presented by the mobile terminal to be zoomed in response to the indication that the mobile terminal is moved toward or away from a user of the near eye display.

7. A method according to claim 6 wherein causing the image that is presented by the mobile terminal to be zoomed comprises causing the image that is presented by the mobile terminal to be zoomed in a disproportionate manner relative to movement of the mobile terminal toward or away from the user of the near eye display such that the image that is presented by the mobile terminal is no longer in synchronization with the index image.

8. A method according to claim 1 further comprising determining an orientation of the mobile terminal, wherein determining the image to be presented by the mobile terminal is also based upon the orientation of the mobile terminal.

9. A method according to claim 1 further comprising causing the mobile terminal to paste content into the index image generated by the near eye display.

10. An apparatus comprising at least one processor and at least one memory including computer program instructions, the at least one memory and the computer program instructions configured to, with the at least one processor, cause the apparatus at least to:
determine a position of a mobile terminal relative to an index image generated by a near eye display of as user, wherein the mobile terminal comprises an electronic computation device comprising a display, wherein the near eye display is configured to be worn by the user, and wherein the index image appears to be at a location further from the near eye display than the mobile terminal that is positioned between the near eye display and the location at which the index image appears;
determine an image to be presented by the display of the mobile terminal based upon the index image and the position of the mobile terminal relative to the index image, wherein the apparatus is caused to determine the image to be presented by the display of the mobile terminal by determining a portion of the index image that is visually aligned with the mobile terminal from a perspective of the user; and
cause the image to be presented by the mobile terminal itself upon the display of the mobile terminal with the image being based on the portion of the index image that is visually aligned with the mobile terminal from the perspective of the user,
wherein the at least one memory and the computer program instructions are configured to, with the at least one processor, cause the apparatus to determine the position of the mobile terminal relative to the index image by determining the position of the mobile terminal relative to the index image based upon an image of one of the mobile terminal or the near eye display captured by a camera of the other of the mobile terminal or the near eye display.

11. An apparatus according to claim 10 wherein the at least one memory and the computer program instructions are configured to, with the at least one processor, cause the apparatus to cause the image to be presented by the mobile terminal by causing the portion of the index image that is aligned with the mobile terminal to be presented by the mobile terminal.

12. An apparatus according to claim 11 wherein the at least one memory and the computer program instructions are further configured to, with the at least one processor, cause the apparatus to cause the portion of the index image that is aligned with the mobile terminal to be blanked from the near eye display.

13. An apparatus according to claim 10 wherein the at least one memory and the computer program instructions are configured to, with the at least one processor, cause the apparatus to cause the image that is presented by the mobile terminal by causing the image that is presented by the mobile terminal to be different than a portion of the index image that is aligned with the mobile terminal.

14. An apparatus according to claim 13 wherein the at least one memory and the computer program instructions are configured to, with the at least one processor, cause the apparatus to cause the image that is presented by the mobile terminal to be different by causing the image that is presented by the mobile terminal to be more clear than, to be more detailed than or to be augmented relative to the portion of the index image that is aligned with the mobile terminal.

15. An apparatus according to claim 10 wherein the at least one memory and the computer program instructions are further configured to, with the at least one processor, cause the apparatus to:
   receive an indication that the mobile terminal is moved toward or away from a user of the near eye display; and
   cause the image that is presented by the mobile terminal to be zoomed in response to the indication that the mobile terminal is moved toward or away from a user of the near eye display.

16. An apparatus according to claim 10 wherein the at least one memory and the computer program instructions are further configured to, with the at least one processor, cause the apparatus to determine an orientation of the mobile terminal, wherein the at least one memory and the computer program instructions are configured to, with the at least one processor, cause the apparatus to determine the image to be presented by the mobile terminal based also upon the orientation of the mobile terminal.

17. A computer program product comprising at least one non-transitory computer-readable storage medium bearing computer program instructions embodied therein for use with a computer, the computer program instructions comprising program instructions configured to:
   determine a position of a mobile terminal relative to an index image generated by a near eye display of a user, wherein the mobile terminal comprises an electronic computation device comprising a display, wherein the near eye display is configured to be worn by the user, wherein the index image appears to be at a location further from the near eye display than the mobile terminal that is positioned between the near eye display and the location at which the index image appears, and wherein the program instructions configured to determine the position of the mobile terminal relative to the index image comprise program instructions configured to determine the position of the mobile terminal relative to the index image based upon an image of one of the mobile terminal or the near eye display captured by a camera of the other of the mobile terminal or the near eye display;
   determine an image to be presented by the display of the mobile terminal based upon the index image and the position of the mobile terminal relative to the index image, wherein the program instructions are configured to determine the image to be presented by the display of the mobile terminal by determining a portion of the index image that is visually aligned with the mobile terminal from a perspective of the user; and
   cause the image to be presented by the mobile terminal itself upon the display of the mobile terminal with the image being based on the portion of the index image that is visually aligned with the mobile terminal from the perspective of the user.

18. A computer program product according to claim 17 wherein the program instructions configured to cause the image to be presented by the mobile terminal comprise program instructions configured to cause the portion of the index image that is aligned with the mobile terminal to be presented by the mobile terminal.

19. A computer program product according to claim 17 wherein the program instructions configured to cause the image to be presented by the mobile terminal comprise program instructions configured to cause the image that is presented by the mobile terminal to be different than a portion of the index image that is aligned with the mobile terminal.

20. A computer program product according to claim 17 wherein the program instructions configured to cause the image that is presented by the mobile terminal to be different comprise program instructions configured to cause the image that is presented by the mobile terminal to be more clear than, to be more detailed than or to be augmented relative to the portion of the index image that is aligned with the mobile terminal.

* * * * *

UNITED STATES PATENT AND TRADEMARK OFFICE
CERTIFICATE OF CORRECTION

PATENT NO. : 9,201,625 B2  
APPLICATION NO. : 13/530650  
DATED : December 1, 2015  
INVENTOR(S) : Karkkainen et al.

Page 1 of 1

It is certified that error appears in the above-identified patent and that said Letters Patent is hereby corrected as shown below:

In the claims:

Column 15,  
Line 58, Claim 6, "as user" should read --a user--.

Column 16,  
Line 17, Claim 10, "as user" should read --a user--.

Signed and Sealed this  
Fifth Day of July, 2016

Michelle K. Lee  
*Director of the United States Patent and Trademark Office*